(12) United States Patent
Bukofser et al.

(10) Patent No.: US 8,780,758 B2
(45) Date of Patent: Jul. 15, 2014

(54) NETWORK FLOW MONITORING AND ANALYSIS

(75) Inventors: Robert Bukofser, Bedford, MA (US); Graeme Young, Marlborough, MA (US); Hazel Young, legal representative, Marlborough, MA (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 12/959,355

(22) Filed: Dec. 2, 2010
(Under 37 CFR 1.47)

(65) Prior Publication Data

US 2012/0140671 A1 Jun. 7, 2012

(51) Int. Cl.
| | |
|---|---|
| H04L 12/28 | (2006.01) |
| H04L 1/00 | (2006.01) |
| G06F 15/173 | (2006.01) |
| H04L 12/24 | (2006.01) |
| H04L 12/56 | (2006.01) |
| H04L 29/06 | (2006.01) |

(52) U.S. Cl.
CPC ............... *H04L 41/12* (2013.01); *H04L 47/10* (2013.01); *H04L 45/00* (2013.01); *H04L 29/06* (2013.01)
USPC ........... 370/254; 370/232; 370/401; 370/241; 709/238; 709/230

(58) Field of Classification Search
None
See application file for complete search history.

(56) References Cited

U.S. PATENT DOCUMENTS

| | | | |
|---|---|---|---|
| 7,113,990 B2 | 9/2006 | Scifres | |
| 7,305,464 B2 | 12/2007 | Phillipi | |
| 7,412,514 B2 | 8/2008 | Shuster | |
| 2003/0028624 A1* | 2/2003 | Hasan et al. | 709/220 |
| 2005/0135330 A1* | 6/2005 | Smith et al. | 370/351 |
| 2007/0280241 A1* | 12/2007 | Verma | 370/392 |
| 2008/0225716 A1* | 9/2008 | Lange | 370/232 |
| 2011/0096695 A1* | 4/2011 | Natarajan et al. | 370/254 |

OTHER PUBLICATIONS

Bharathan—"An OPNET Model Simulation Study of the VISA Protocol for Multi-Network Authentication", University of Florida, White Paper (Jan. 2008).
Cicso—"Introduction to Cisco IOS NetFlow", White Paper, (copyright 1992-2007).
Clark—"Upgrading from Tivoli NetView 7.1.4/5 to IBM Network Manager IP Edition 3.8 Version 1.0" (Mar. 2009).
Estan—"Building a Better NetFlow"; SIGCOMM'04, Portland, OR (2004).
Fluke—"Netflow Tracker", Flukenetworks.com (© 2009).
ITNM—"IBM Tivoli Network Manager Software", IBM Corp. (© 2009).

(Continued)

*Primary Examiner* — Kevin C Harper
*Assistant Examiner* — Peter Chen
(74) *Attorney, Agent, or Firm* — David Mims; Mark P Kahler

(57) ABSTRACT

To analyze the performance of a network including edge routers and a hub router coupled together by communication links, an analysis method includes discovering the topology of the network that is initially unknown. An information handling system (IHS) determines baseline performance information with respect to the discovered topology of network, the baseline performance information including network capacity information on a per link basis. The discovered topology of the network is speculatively changed to provide a speculatively changed network with prospects for performance improvement. The IHS determines an estimated impact of the speculative change to the discovered topology of the network by repeating the topology discovery and the determination of baseline performance using the speculative changed topology.

18 Claims, 6 Drawing Sheets

(56) References Cited

OTHER PUBLICATIONS

Netflow—Wikipedia Encyclopedia (page last modified Jun. 4, 2009).
Network Instruments—Extending Network Visibility by Leveraging NetFlow and sFlow Technologies(2006).
OPNET—"Network R&D Solutions", Opnet Technologies, www.opnet.com (© 2009).
Potemans—"Implementation of an Advanced Traffic Model in OPNET Modeler", Katholieke Universiteit Leuven (Jan. 2003).
Pulse—"IBM Tivoli Network Manager", Network Topology Management and Root Cause Analysis, The Premier Service Management Event, Las Vegas, Nevada, Feb. 8-12, 2009 (© 2009).
Quittek—"Requirements for IP Flow Information Export (IPFIX)", Network Working Group (Oct. 2004).
Rosen—Exterior Gateway Protocol (EGP), Bolt, Beranek and Newman, Inc. (Oct. 1982).
Staalhagen—"Introduction to OPNET Modeler", EuroFGI Summer School (Aug. 20-24, 2007).
Tivoli—"Netcool Performance Analyzer, Version 4.1", Installation and User Guide (© 2004, 2009).
TNPM—"IBM Tivoli Netcool Performance Manager V1.1", IBM US Software Announcement (Nov. 25, 2008).
Traffic Explorer—"Traffic Explorer", Packet Design, Santa Clara, CA (Jul. 2008).
Trammel—"From NetFlow to IPFIX, the evolution of IP flow information export", NANOG 41—Albuquerque, NM (Oct. 15, 2007).

* cited by examiner

NETWORK FLOW MONITORING AND ANALYSIS

BACKGROUND

The disclosures herein relate generally to information handling systems (IHSs), and more specifically, to communications between IHSs in a network system.

Network systems may include information handling systems (IHSs) that couple together via communication routers. The connections of various routers to one another and to the IHSs form a network topology. A network may distribute routers and IHSs among a large number of different geographic locations. It is desirable to configure the network topology to make efficient use of network resources such as communication links among the routers of the network.

BRIEF SUMMARY

In one embodiment, a method of network performance determination is disclosed. The method includes discovering, by a first information handling system (IHS), a topology of a network that includes a plurality of routers coupled together by a plurality of communication links, the plurality of routers including edge routers and at least one hub router, thus providing a discovered topology. The method includes determining baseline performance information, by the first IHS, with respect to the discovered topology of network, the baseline performance information including network capacity information on a per link basis. The method also includes speculatively changing the discovered topology of the network to provide a speculatively changed network. The method further includes determining, by the first IHS, an estimated impact of the speculative change to the discovered topology of the network by repeating the discovering and determining steps.

In another embodiment, a network analysis system is disclosed. The network analysis system includes an information handling system (IHS) that is configured to discover a topology of a network that includes a plurality of routers coupled together by a plurality of communication links, the plurality of routers including edge routers and at least one hub router, thus providing a discovered topology. The IHS is also configured to determine baseline performance information with respect to the discovered topology of the network, the baseline performance information including network capacity information on a per link basis. The IHS is further configured to speculatively change the discovered topology of the network to provide a speculatively changed network. The IHS is also configured to determine an estimated impact of the speculative change to the discovered topology of the network by repeating the discovering and determining steps.

In yet another embodiment, a computer program product is disclosed. The computer program product includes a computer readable storage medium. The computer program product also includes first program instructions to discover a topology of a network that includes a plurality of routers coupled together by a plurality of communication links, the plurality of routers including edge routers and at least one hub router, thus providing a discovered topology. The computer program product further includes second program instructions to determine baseline performance information with respect to the discovered topology of network, the baseline performance information including network capacity information on a per link basis. The computer program product still further includes third program instructions to speculatively change the discovered topology of the network to provide a speculatively changed network. The computer program product also includes fourth program instructions to determine an estimated impact of the speculative change to the discovered topology of the network by repeating the discovering of the topology and determining of baseline performance information. The first, second, third and fourth program instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

In one embodiment, the disclosed methodology evaluates the topology of a network together with network performance information to determine the effect of proposed network changes on network performance. This methodology may assist the network designer in determining how to invest network upgrade resources in an efficient manner.

Advanced networks may have a large number of devices and nodes that could benefit from monitoring when making a decision regarding which particular network resources to upgrade. One approach is to collect large amounts of information to determine which particular links are congested and to upgrade bandwidth on those congested links. However, this may not result in the most effective use of network upgrade resources.

Figure 1:
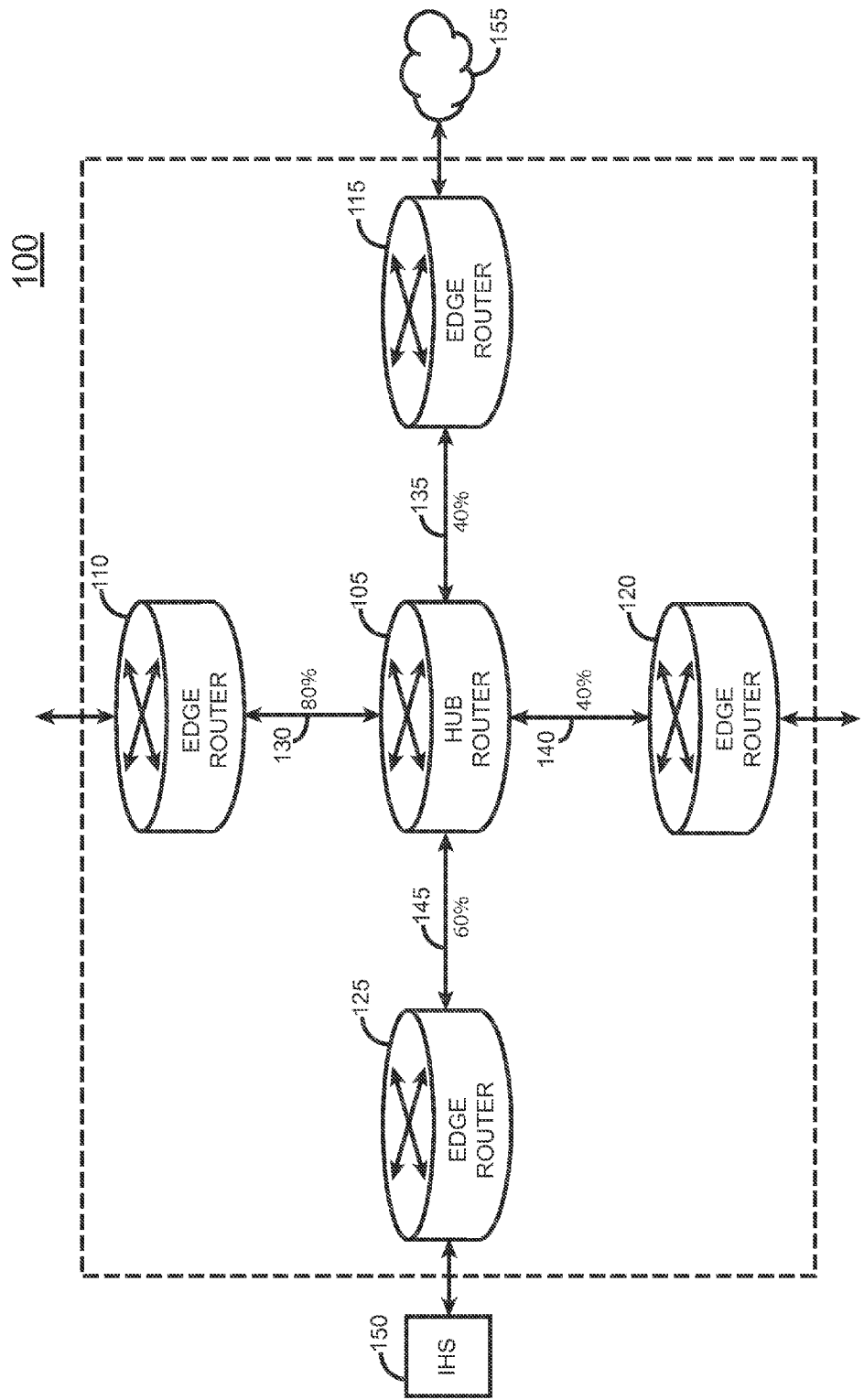
FIG. 1 shows a block diagram of a representative network system.

FIG. 1 shows a network 100 that includes a hub router 105 that couples to edge routers 110, 115, 120 and 125 via communication links 130, 135, 140 and 145, respectively, as shown. A hub router is a router that locates in the interior of a network, whereas an edge router is a router that locates on the edge of a network. FIG. 1 shows both edge routers and a hub router. Edge router 125 couples to an information handling system (IHS) 150. Edge router 115 may couple to other IHSs and devices (not shown) via an Internet cloud 155. Edge routers 110, 115, 120 and 125 may connect to other IHSs and devices not shown.

Network 100 of FIG. 1 exhibits a "hub and spoke" topology, i.e. a star topology. As network use climbs, it is possible than one of links 130, 135, 140 and 145 may approach a capacity threshold. For example, link 130 exhibits 80% bandwidth usage. Increases in network traffic may ultimately exceed the bandwidth capabilities of link 130. In contrast, links 135, 140 and 145 exhibit 40%, 40% and 60% bandwidth usage, respectively.

Figure 2:
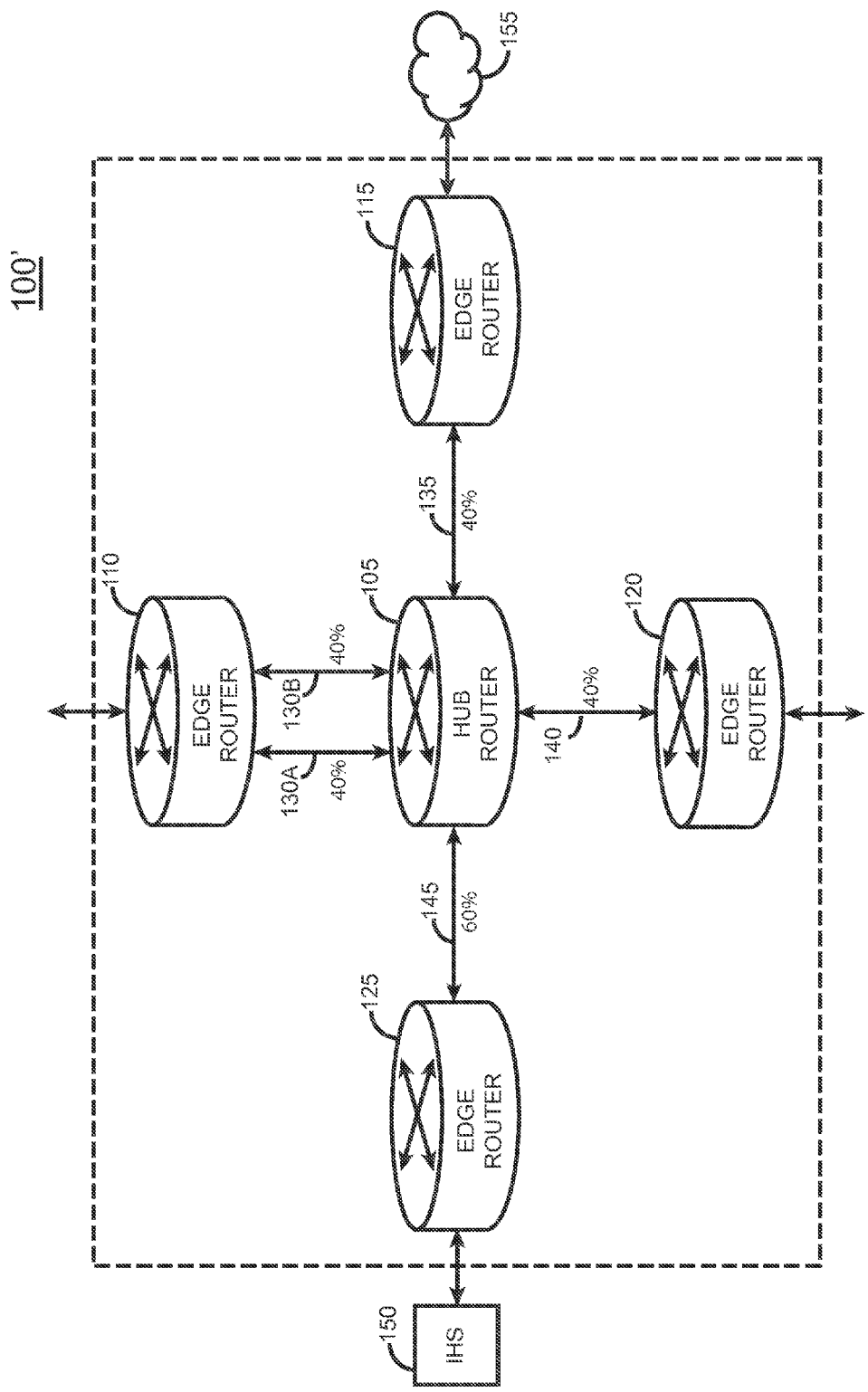
FIG. 2 is a block diagram of a network system with modified topology.

One approach to address the high bandwidth consumption on link 130 is seen in FIG. 2 which shows a modified or upgraded network 100'. Upgraded network 100' includes two communication links 130A, 130B in place of communication link 130. This upgraded network topology or configuration reduces the 80% bandwidth consumption of communication link 130 to 40% on each of communication links 130A, 130B.

Figure 3:
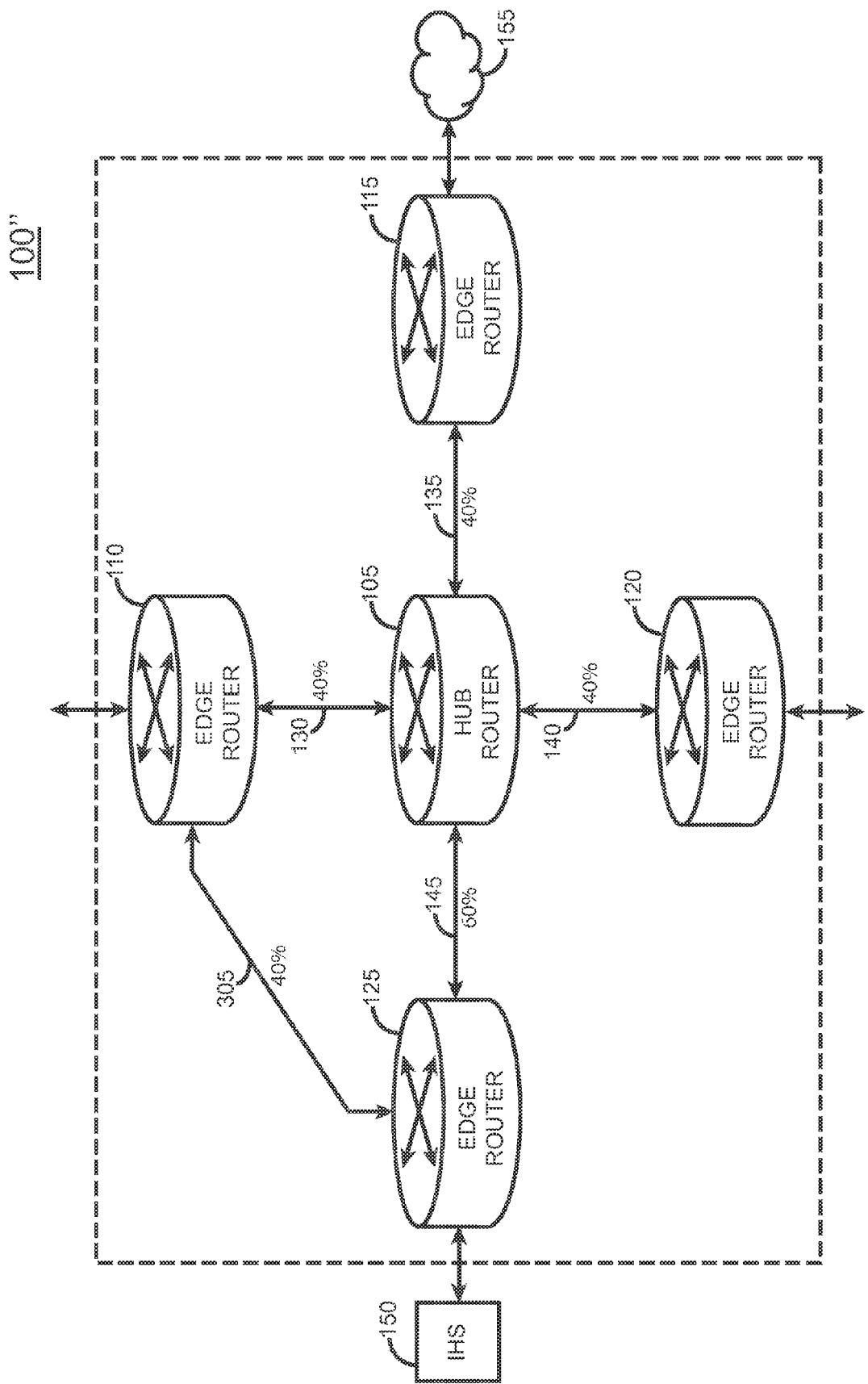
FIG. 3 is a block diagram of a network system with another modified topology.

While the upgraded network topology of FIG. 2 does alleviate congestion on communication link 130, depending on how traffic flows in the network, it may be more cost effective to create a new link between two spokes (i.e. links) because in a star topology such is in network 100, the majority of traffic flow may be between two spokes of the network. For example, a majority of the traffic between edge router 110 and hub router 105 may actually be traffic between edge router 110 and edge router 125. In this instance, the upgraded network topology of network 100" of FIG. 3, which adds a communication link 305 between edge router 110 and edge router 125, offers a better investment in upgraded network resources. Adding capacity without understanding traffic flow may result in upgrade resource decisions that are not as efficient as they could be.

Figure 4:
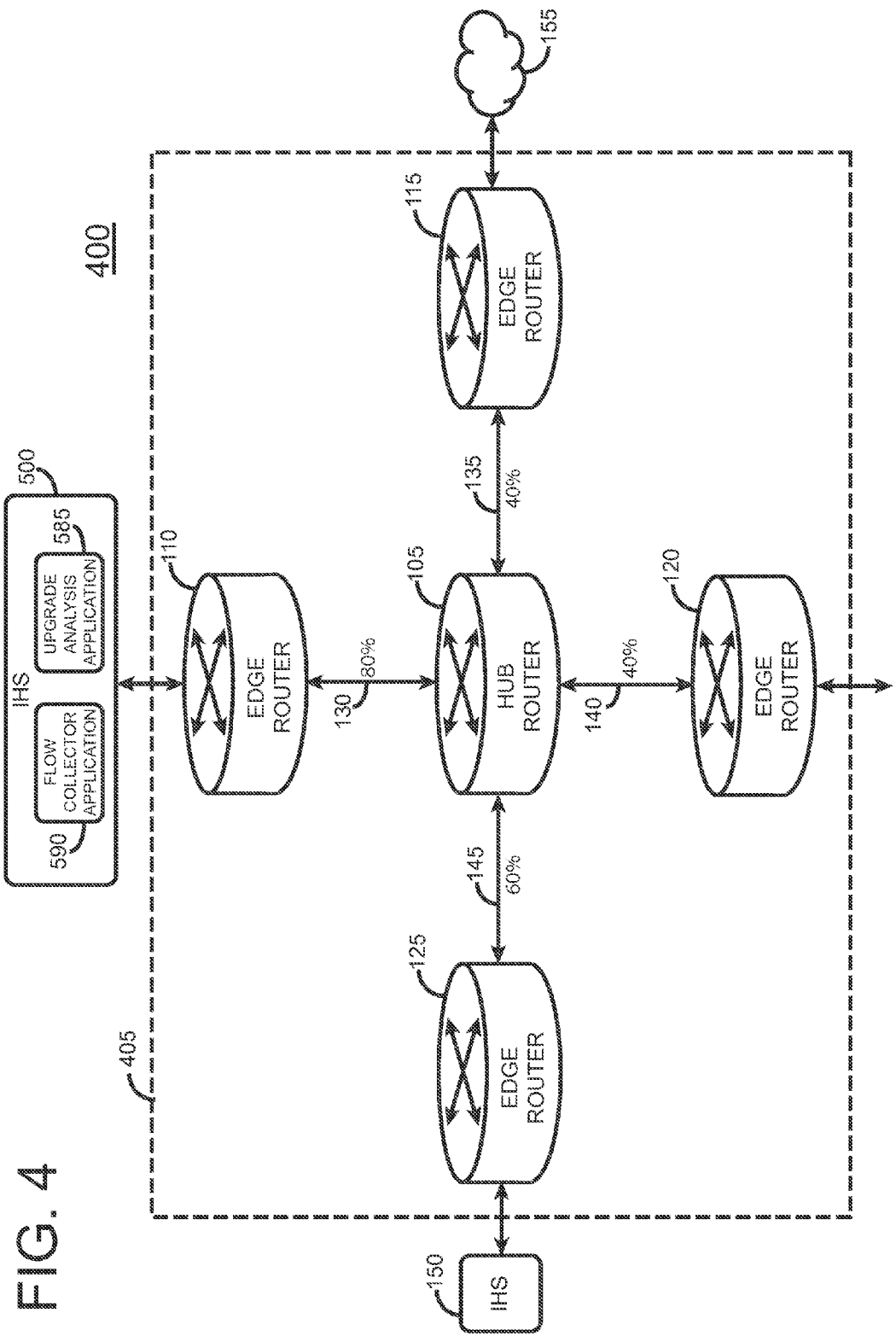
FIG. 4 is a block diagram of a network system including an information handling system (IHS) that employs the disclosed network analysis methodology.

FIG. 4 shows a network system 400 that includes an IHS 500 that couples to one of the routers of network 405, for example to edge router 110. IHS 500 includes an upgrade analysis application 585 that assists the network designer or other entity in evaluating network upgrade changes for improved network performance. IHS 500 also includes a flow collector application 590 that collects traffic flows from the routers of network 400. In network 405, each of edge routers 110, 115, 120 and 125 tracks traffic flows or conversations that pass on the exterior surfaces of the network, the exterior surfaces being formed by the edge routers and respective links 130, 135, 140 and 145 that couple thereto. A flow or conversation includes all packets that exhibit the same source/destination address pair, the same source/destination port pair and the same class of service. In other words, each edge router groups all packets that exhibit the above common characteristics into a flow. The edge routers 110, 115, 120 and 125 aggregate their respective flows on a regular basis and send the aggregated volume of traffic in bytes to flow collector application 590 in IHS 500. Flow collector application 590 collects the aggregated traffic flows from each of edge routers 110, 115, 120 and 125 and stores these aggregated traffic flows. Flow collector application 590 stores the aggregated traffic flows for each edge router as a series of aggregated traffic flows for each router. Flow collector application 590 may also store the aggregated traffic flow from hub router 105.

Upgrade analysis application 585 performs network discovery on network 405 to determine the topology of network 405. Initially, upgrade analysis application 585 does not know the topology of network 405. When upgrade analysis application 585 launches, upgrade analysis application 585 tests network 405 to determine its topology. In other words, upgrade analysis application 585 determines all routers and devices in network 405 and determines the links among those routers and devices. For example, in conducting topology determining operations on network 405, upgrade analysis application 585 determines that network 405 includes a central hub router 105 with four edge routers 110, 115, 120 and 125 that couple thereto in a star or "hub and spoke" configuration. In conducting topology determining operations on network 405, upgrade analysis application 585 also locates the communication links 130, 135, 140 and 145 between hub router 105 and edge routers 110, 115, 120 and 125, respectively. In this manner, upgrade analysis application 585 determines the topology of network 405.

Upgrade analysis application 585 employs the aggregated traffic flows from each of the edge routers as input and determines the network capacity on a "per link" basis using this input. In this manner, upgrade analysis application 585 determines a baseline network capacity on a per link basis before a proposed change is made to network 405. A user may input a proposed network change to upgrade analysis application 585 and, in response, upgrade analysis application 585 again determines the network capacity on a per link basis. In this manner, the user may see the difference between network capacity on a per link basis both before and after the proposed network change. An example of a proposed change that the user may input to upgrade application 585 is to add a communication link between edge router 110 and edge router 125, similar to link 305 shown in FIG. 3. By comparing the network capacity on a per link basis both before and after the proposed network change, the user may observer whether or not the proposed network change is efficient.

The upgrade analysis application 585 combines network discovery information that determines the network topology together with network performance information such as the network capacity on a per link basis to establish a network performance baseline. In one embodiment, the disclosed methodology may display a graphical or block diagram representation of network 405 on a display 540 of IHS 500. In this manner, upgrade analysis application 585 displays the discovered network topology to the user. Upgrade analysis application 585 may also display the network capacity on a per link basis adjacent each communication link of the topology that display 540 depicts.

Upgrade analysis application 585 monitors the flows at the exterior surfaces of the network that the links of network 405 forms. Application 585 monitors both traversing flows and terminating flows. Traversing flows are those flows that enter network 405 and exit network 405 such as those within the dashed line the designates network 405 of FIG. 4. In other words, traversing traffic flow are those traffic flows that go into network 405 and then go back out of network 405 without interacting with network 405 other than network 405 providing transportation for those traffic flows. In other words, in the case of traversing traffic flows, the network acts as a transporter without interacting with the traffic. In contrast, terminating traffic flow refers to traffic that goes into network 405 and reaches a destination within network 405 at which point the traffic terminates. Terminating traffic includes at least one end point within network 405. Upgrade analysis application 585 may also receive aggregated traffic flows from internal routers such as hub router 105 to assist in the evaluation of traffic flow within the network.

Figure 5:
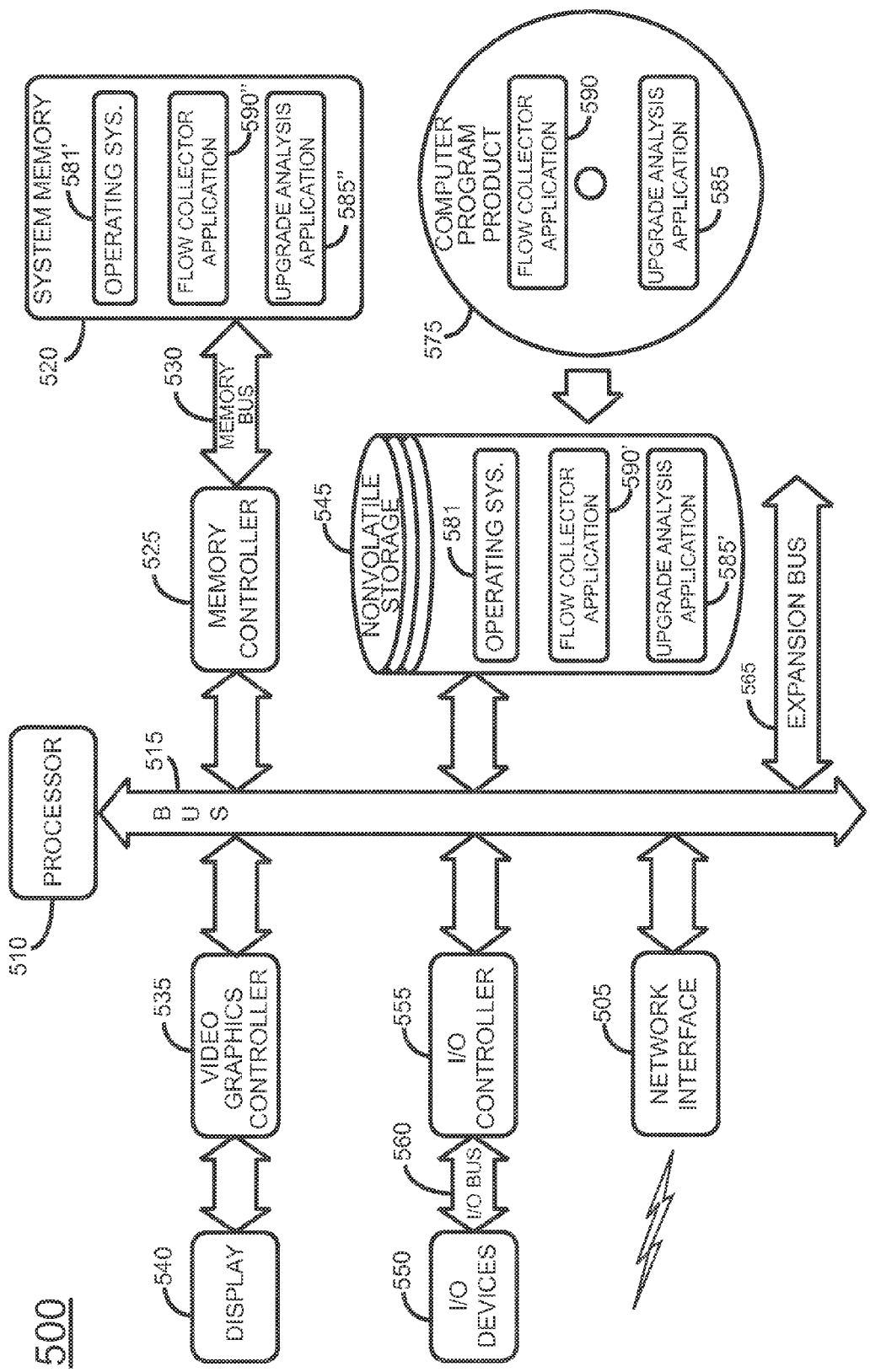
FIG. 5 is a block diagram of the IHS of FIG. 4.

FIG. 5 is a block diagram of IHS 500 of network system 400 shown FIG. 4. IHS 500 is configured to practice the disclosed network analysis methodology. IHS 500 includes a processor 510 that may include multiple cores. IHS 500 processes, transfers, communicates, modifies, stores or otherwise handles information in digital form, analog form or other form. IHS 500 includes a bus 515 that couples processor 510 to system memory 520 via a memory controller 525 and memory bus 530. In one embodiment, system memory 520 is external to processor 510. System memory 520 may be a static random access memory (SRAM) array or a dynamic random access memory (DRAM) array. Processor 510 may also includes local memory (not shown) such as L1 and L2 caches (not shown). A video graphics controller 535 couples display 540 to bus 515. Nonvolatile storage 545, such as a hard disk drive, CD drive, DVD drive, or other nonvolatile storage couples to bus 515 to provide IHS 500 with permanent storage of information. I/O devices 550, such as a keyboard and a mouse pointing device, couple to bus 515 via I/O controller 555 and I/O bus 560.

One or more expansion busses 565, such as USB, IEEE 1394 bus, ATA, SATA, PCI, PCIE, DVI, HDMI and other busses, couple to bus 515 to facilitate the connection of peripherals and devices to IHS 500. A network interface adapter 505 couples to bus 515 to enable IHS 500 to connect by wire or wirelessly to a network and other information handling systems. In this embodiment, network interface adapter 505 may also be called a network communication adapter or a network adapter. While FIG. 5 shows one IHS that employs processor 510, the IHS may take many forms. For example, IHS 500 may take the form of a desktop, server, portable, laptop, notebook, or other form factor computer or data processing system. IHS 500 may take other form factors such as a gaming device, a personal digital assistant (PDA), a portable telephone device, a communication device or other devices that include a processor and memory.

IHS 500 includes a network upgrade analysis computer program product on digital media 575 such as a CD, DVD or other media. In one embodiment, digital media 575 includes an application 585 that are configured to practice the disclosed network analysis methodology. Digital media 575 may also store flow collector application 590. In practice, IHS 500 may store an operating system 581 (OPERATING SYS), application 585 and flow collector application 590 on non-volatile storage 545 as operating system 581', application 585' and application 590. When IHS 500 initializes, the IHS loads operating system 581' into system memory 420 for execution as operating system 581". IHS 500 also loads application 585' into system memory 520 as application 585". IHS 500 further loads application 590' into system memory 520 as application 590".

As will be appreciated by one skilled in the art, aspects of the disclosed network upgrade analysis method may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, such as CPP 575 embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 6:
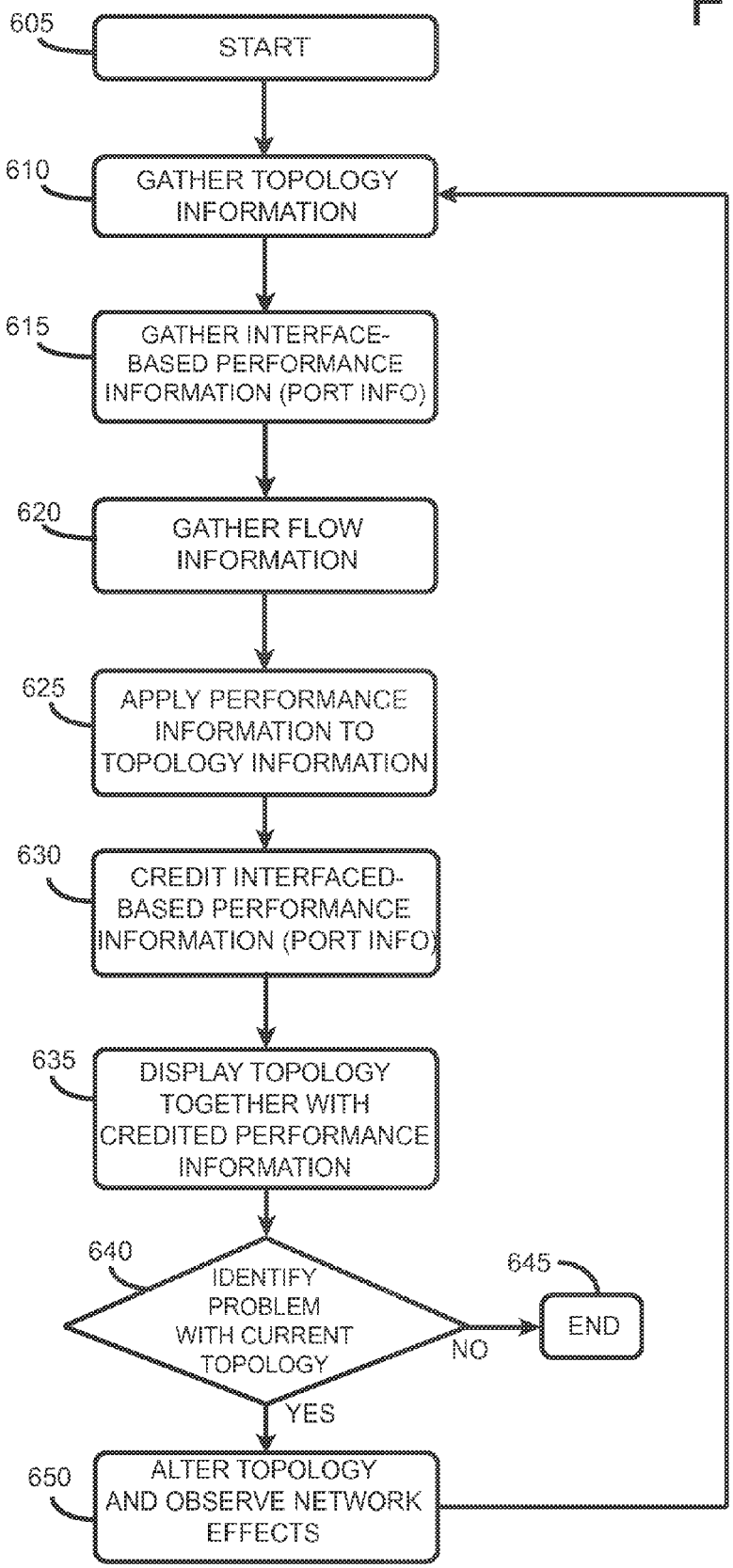
FIG. 6 is a flowchart of the disclosed network analysis methodology.

Aspects of the present invention are described below with reference to flowchart illustrations and/or block diagrams of methods, apparatus (systems) and computer program products according to embodiments of the invention. It will be understood that each block of the flowchart of FIG. 6 illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIG. 9 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIG. 6 described below.

The flowchart of FIG. 6 illustrates the architecture, functionality, and operation of possible implementations of systems, methods and computer program products that perform network analysis in accordance with various embodiments of the present invention. In this regard, each block in the flowchart of FIG. 6 may represent a module, segment, or portion of code, which comprises one or more executable instructions for implementing the specified logical function(s). It should also be noted that, in some alternative implementations, the functions noted in the block may occur out of the order noted in FIG. 6. For example, two blocks shown in succession may, in fact, be executed substantially concurrently, or the blocks may sometimes be executed in the reverse order, depending upon the functionality involved. It will also be noted that each block of FIG. 6 and combinations of blocks in the block diagrams and/or flowchart illustration, can be implemented by special purpose hardware-based systems that perform the specified functions or acts, or combinations of special purpose hardware and computer instructions.

FIG. 6 is a flowchart that depicts the process steps that upgrade analysis application 585 of IHS 500 performs to carry out one implementation of the disclosed network analysis methodology. Process flow commences at start block 605 at which IHS 500 initializes and launches operating system 581, upgrade analysis application 585' and flow collector application 590'. Upgrade analysis application 585" tests network 405 and determines the topology of network 405, as per block 610. In the particular network topology example of FIG. 4, application 585" determine the existence of hub router 105 and edge routers 110, 115, 120 and 125. Upgrade analysis application 585" also determines the communication links 130, 135, 140 and 145 between the hub router and the edge routers.

Upgrade analysis application 585" also gathers interface-based performance information, as per block 615. Each router couples to a communication link via a communication interface (not shown). Each router includes multiple communication interfaces for respective communication links. Upgrade analysis application 585" gathers interface-based performance information from these communication interfaces that couple the routers to the communication links. An example of the gathered interface-based performance information is Simple Network Management Protocol (SNMP) performance information. For example, the method instruments an individual port or virtual port on a particular router to obtain interface-based performance information from that router. The method may instrument multiple ports in this manner to obtain performance information from multiple ports on multiple routers in network 405.

Upgrade analysis application 585" gathers flow information, as per block 620. For example, application 585" collects aggregated flows from each hub router such as router 105 and edge routers 110, 115, 120 and 125. Upgrade analysis application 585" stores the aggregated flows for each router of network 405 as a series of aggregated flows for each router. In actual practice, upgrade analysis application 585" may use flow collector application 590 to collect and store this flow information.

Upgrade analysis application 585" applies the performance information to the topology information, as per block 625. Upgrade analysis application 585" credits the interfaced-based performance information or port information to the topology to determine the bandwidth performance on each of the communication links of the topology, as per block 630. Links may be assigned different line widths, different colors and other visual distinctions to show the respective bandwidth used for each link and total bandwidth. The upgrade analysis application 585" then causes the display 540 of IHS 500 to show the discovered network topology together with the credited performance information for each communication link, as indicated by the above described visual distinctions, per block 635. By observing this display, the user may judge which particular link or links are congested and in need of a resource upgrade. It may be more effective to add a link between edge routers, such as between edge routers 110 and 125, rather than add another link between hub router 105 and edge router 110 in some applications. In this manner, the user may or may not identify a problem with the current topology at decision block 640. If the user finds no network performance problem using the current topology, then the upgrade analysis application 585" terminates at end block 645. However, if the user identifies a network performance problem at decision block 640 by looking at display 540, then the user may alter the topology and observe the resultant network performance effects, as per block 650. More particularly, the user alters the topology and process flow continues back to block 610 at which the network upgrade analysis process begins again, except using the new candidate network topology. If the new candidate network topology exhibits superior network performance in comparison with the previous topology, then the user may decide to make the appropriate investment in network infrastructure to implement the candidate topology, for example by adding an appropriately positioned communication link between routers.

As will be appreciated by one skilled in the art, aspects of the disclosed memory management technology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of network performance determination, comprising:
   discovering, by an upgrade analysis application of a first information handling system (IHS), a topology of a particular network that includes a plurality of routers coupled together by a plurality of communication links, the plurality of routers including edge routers and at least one hub router, thus providing a discovered topology, wherein the particular network exhibits traversing traffic flows and terminating traffic flows, wherein the edge routers and at least one hub router provide respective aggregated traffic flows;
   monitoring, by the upgrade analysis application of the first IHS, the traversing traffic flows and terminating traffic flows of the particular network;

receiving, by the upgrade analysis application of the first IHS, aggregated traffic flows from the plurality of edge routers and at least one hub router;

determining baseline performance information, by the upgrade analysis application of the first IHS, with respect to the discovered topology of the particular network, the baseline performance information including network capacity information on a per link basis, the determining baseline performance information including using the traversing traffic flows, terminating traffic flows and aggregated traffic flows from the edge routers and at least one hub router as input;

speculatively changing, in response to user input, the discovered topology of the particular network to a new user-selected candidate network topology to provide a speculatively changed network; and determining, by the first IHS, an estimated impact of the speculative change to the discovered topology to the new user-selected candidate network topology by repeating the discovering and determining steps.

2. The method of claim 1, wherein the baseline performance information includes traffic flow information.

3. The method of claim 1, further comprising aggregating, by the first IHS, the traffic flow of the edge routers on the per link basis thus providing aggregated traffic flows.

4. The method of claim 3, further comprising determining, by the first IHS, the network capacity on a per communication link basis using the aggregated traffic flows as input.

5. The method of claim 1, wherein the determining baseline performance information step includes crediting traversing traffic flows and terminating traffic flows among the communication links.

6. The method of claim 1, further comprising displaying, by a display, a representation of the discovered topology of the network together with the baseline performance information applied to the discovered topology to display the network capacity information on a per link basis.

7. A network analysis information handling system (IHS), comprising:
a processor,
a bus coupled to the processor;
a memory, coupled to the bus, the memory including an upgrade analysis application that is configured to:
discover a topology of a particular network that includes a plurality of routers coupled together by a plurality of communication links, the plurality of routers including edge routers and at least one hub router, thus providing a discovered topology, wherein the particular network exhibits traversing traffic flows and terminating traffic flows, wherein the edge routers and at least one hub router provide respective aggregated traffic flows;
monitor the traversing traffic flows and terminating traffic flows of the particular network;
receive aggregated traffic flows from the plurality of edge routers and at least one hub router;
determine baseline performance information with respect to the discovered topology of the particular network, the baseline performance information including network capacity information on a per link basis, wherein determining baseline performance information includes using the traversing traffic flows, terminating traffic flows and aggregated traffic flows from the edge routers and at least one hub router as input;
speculatively change, in response to user input, the discovered topology of the particular network to a new user-selected candidate network topology to provide a speculatively changed network; and
determine an estimated impact of the speculative change to the discovered topology to the new user-selected candidate network topology by repeating the discovering and determining steps.

8. The system of claim 7, wherein the baseline performance information includes traffic flow information.

9. The system of claim 7, wherein the IHS is further configured to aggregate the traffic flow of the edge routers on the per link basis thus providing aggregated traffic flows.

10. The system of claim 9, wherein the IHS is further configured to determine the network capacity on a per communication link basis using the aggregated traffic flows as input.

11. The system of claim 7, wherein the IHS is configured to determine baseline performance information by crediting traversing traffic flows and terminating traffic flows among the communication links.

12. The system of claim 7, wherein the IHS is further configured to display a representation of the discovered topology of the network together with the baseline performance information applied to the discovered topology to display the network capacity information on a per link basis.

13. A computer program product, comprising:
a non-transitory computer readable storage medium;
first program instructions that discover a topology of a particular network that includes a plurality of routers coupled together by a plurality of communication links, the plurality of routers including edge routers and at least one hub router, thus providing a discovered topology, wherein the particular network exhibits traversing traffic flows and terminating traffic flows, wherein the edge routers and at least one hub router provide respective aggregated traffic flows;
second program instructions that monitor the traversing traffic flows and terminating traffic flows of the particular network;
third instruction that receive aggregated traffic flows from the plurality of edge routers and at least one hub router;
fourth program instructions that determine baseline performance information with respect to the discovered topology of the particular network, the baseline performance information including network capacity information on a per link basis, the determining baseline performance information including using the traversing traffic flows, terminating traffic flows and aggregated traffic flows from the edge routers and at least one hub router as input;
fifth program instructions that speculatively change, in response to user input, the discovered topology of the particular network to a new user-selected candidate network topology to provide a speculatively changed network; and
sixth program instructions that determine an estimated impact of the speculative change to the discovered topology to the new user-selected candidate network topology by repeating the discovering and determining steps;
wherein the first, second, third and fourth program instructions are stored on the computer readable storage medium.

14. The computer program product of claim 13, wherein the baseline performance information includes traffic flow information.

15. The computer program product of claim 13, further comprising fifth program instructions to aggregate the traffic flow of the edge routers on the per link basis thus providing aggregated traffic flows.

16. The computer program product of claim 15, further comprising sixth program instructions to determine the network capacity on a per communication link basis using the aggregated traffic flows as input.

17. The computer program product of claim 13, further comprising seventh program instructions determine baseline performance information by crediting traversing traffic flows and terminating traffic flows among the communication links.

18. The computer program product of claim 13, further comprising eighth program instructions to display a representation of the discovered topology of the network together with the baseline performance information applied to the discovered topology to display the network capacity information on a per link basis.

* * * * *